No. 706,370. Patented Aug. 5, 1902.
F. S. YOUNG & W. W. UEBERROTH.
FILTER.
(Application filed Oct. 21, 1901.)
(No Model.)
3 Sheets—Sheet 2.
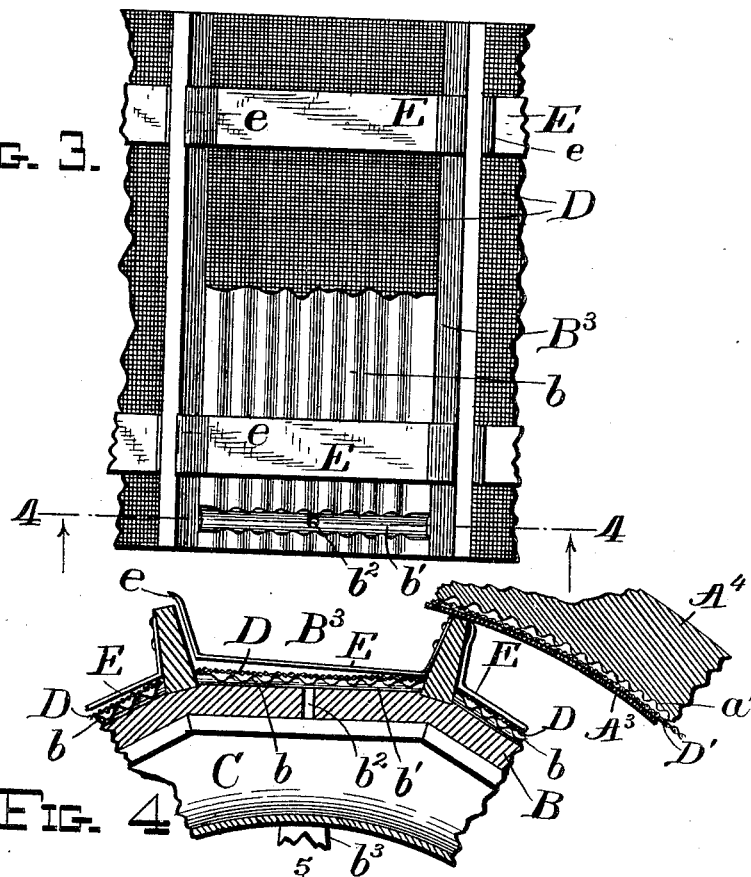
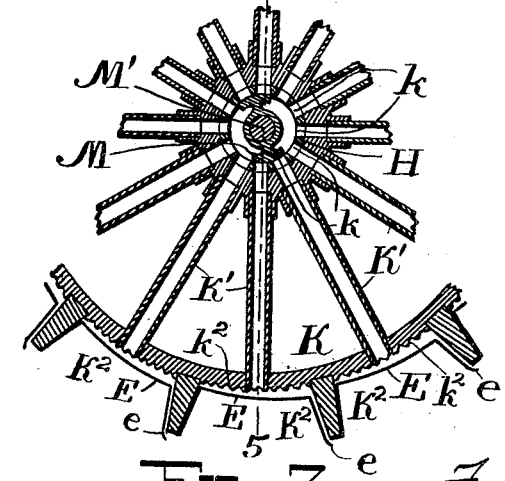
Witnesses
Percy C. Bowen
Stephen Giusta
Inventors
F. S. Young and
W. W. Ueberroth
By Wilkinson & Fisher
Attorneys No. 706,370. Patented Aug. 5, 1902.
F. S. YOUNG & W. W. UEBERROTH.
FILTER.
(Application filed Oct. 21, 1901.)
(No Model.) 3 Sheets—Sheet 3.
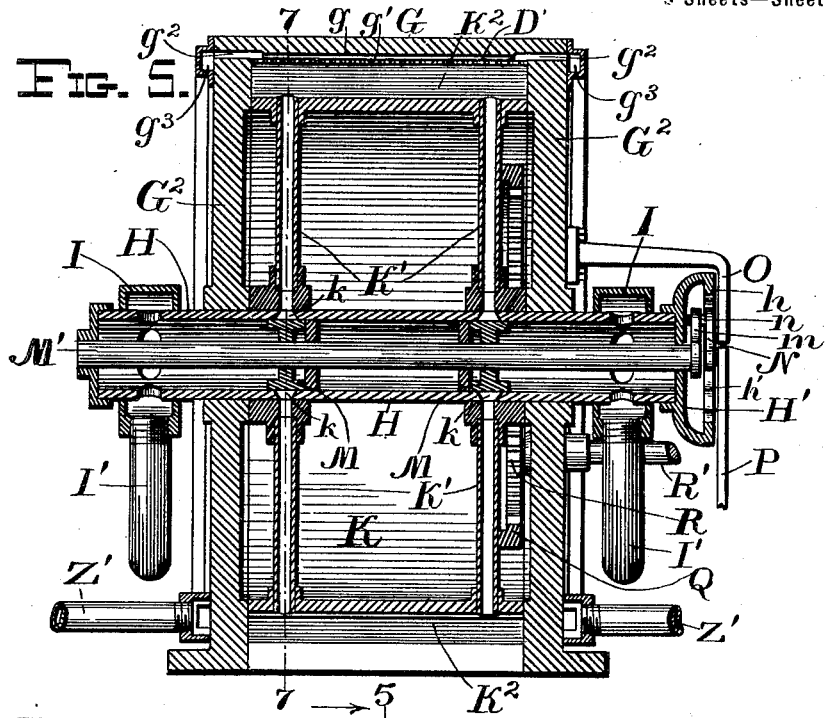
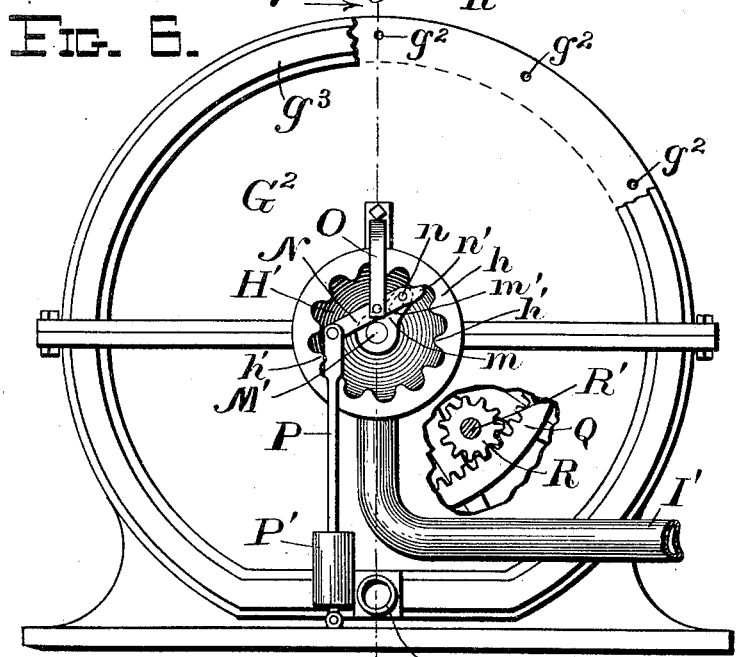

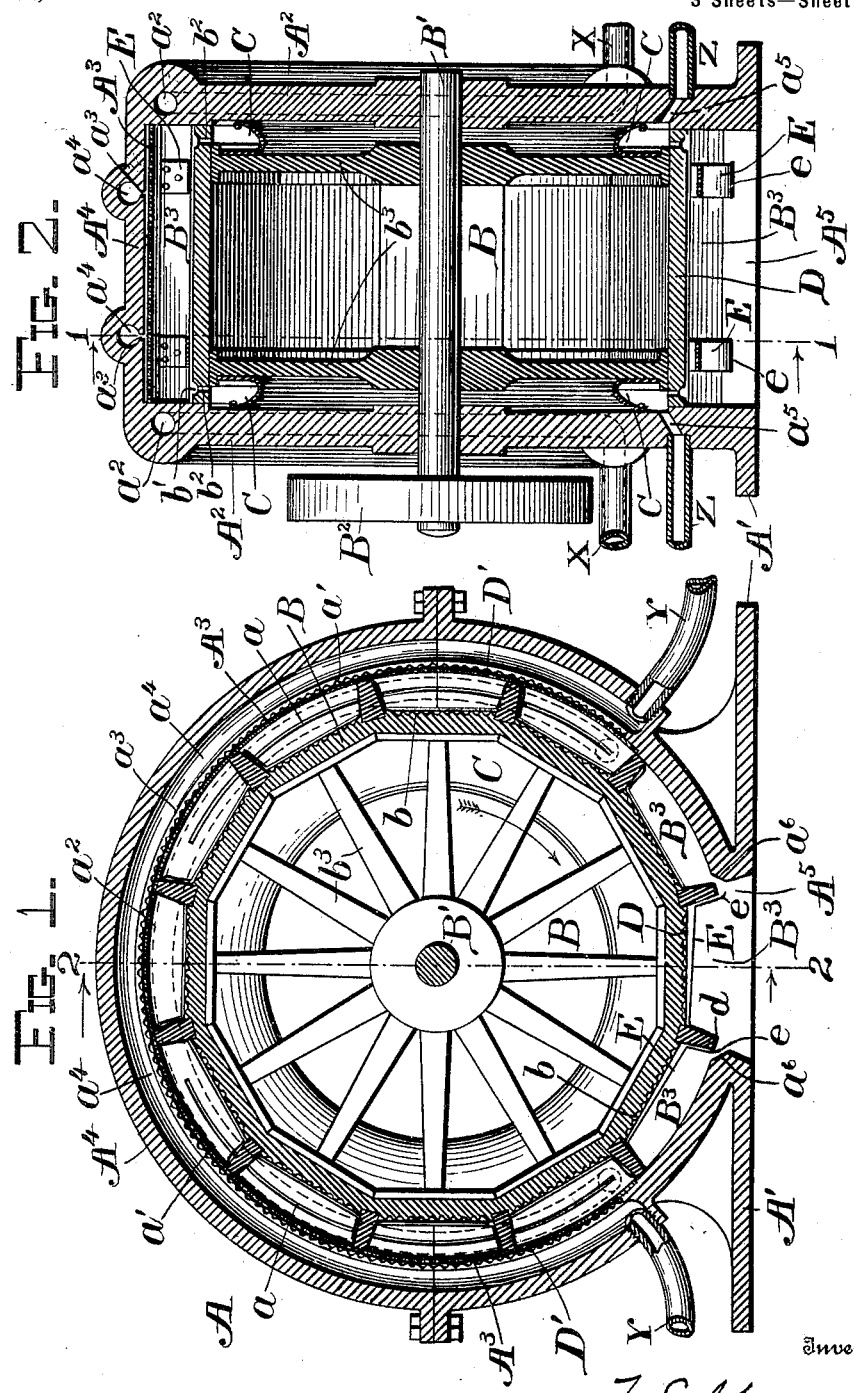

UNITED STATES PATENT OFFICE.

FRANK S. YOUNG, OF NORRISTOWN, AND WILLIAM W. UEBERROTH, OF SOUTH BETHLEHEM, PENNSYLVANIA, ASSIGNORS OF ONE-FOURTH TO HENRY DE HUFF, OF PHILADELPHIA, PENNSYLVANIA.

FILTER.

SPECIFICATION forming part of Letters Patent No. 706,370, dated August 5, 1902.

Application filed October 21, 1901. Serial No. 79,469. (No model.)

*To all whom it may concern:*

Be it known that we, FRANK S. YOUNG, residing at Norristown, in the county of Montgomery, and WILLIAM W. UEBERROTH, residing at South Bethlehem, in the county of Northampton, and State of Pennsylvania, citizens of the United States, have invented certain new and useful Improvements in Filters; and we do hereby declare the following to be a full, clear, and exact description of the invention, such as will enable others skilled in the art to which it appertains to make and use the same.

Our invention relates to improvements in pressure-filters, and especially to that class of filters in which a drum having pockets is caused to rotate within a cylindrical casing, the material to be filtered being supplied to the pockets through suitable conduits, as will be hereinafter fully described and claimed.

Referring to the accompanying drawings, in which the same parts are designated by the same letters of reference throughout the several views, Figure 1 represents a vertical section taken on the line 1 1 of Fig. 2 looking in the direction of the arrows. Fig. 2 represents a vertical section taken at right angles to Fig. 1 along the line 2 2 looking in the direction of the arrows. Fig. 3 is an enlarged plan of one of the pockets of the drum with the filter-cloth broken away to show the corrugations. Fig. 4 is a detail sectional view, also on an enlarged scale, taken on the line 4 4 of Fig. 3 looking in the direction of the arrows and showing the position of the filter-cloths. Fig. 5 is a vertical section taken along the line 5 5 of Figs. 6 and 7 and looking in the direction of the arrows, showing a modification of the device. Fig. 6 is a side elevation of the modified form shown in Fig. 5, a part being broken away to show the means for turning the drum. Fig. 7 is a detail sectional view taken on the line 7 7 of Fig. 5.

A designates the casing, which is cylindrical, as shown in Fig. 1, and is supported upon a base A'. In the ends $A^2$ of this casing are formed passages $a^2$, concentric with the cylinder and extending about three-quarters of the way around it. The inlet-pipes X communicate with the ends of these passages $a^2$, and concentric ports $a$ open from the said passages into the interior of the casing. The interior of the casing is corrugated, as at $a'$, for about three-quarters of its circumference, the said corrugations being covered by a filter-cloth D', held in place by a perforated plate $A^3$. In the curved wall $A^4$ of the casing are formed two concentric passages $a^4$, which open through the ports $a^3$ into the corrugations $a'$, and these passages $a^4$ communicate with the outlet-pipes Y.

The drum B is mounted within the casing A on a shaft B', journaled in the ends $A^2$ of the casing and having a pulley $B^2$ on one end, by means of which the said drum may be rotated. The drum is formed with a series of pockets $B^3$ in the periphery thereof, the bottoms of the said pockets being corrugated, as at $b$, and having at each end a cross-groove $b'$, which communicates, through a small opening $b^2$, with the interior of the drum.

A gutter C is secured to the arms $b^3$ of the drum to receive the drip from the openings $b^2$. This gutter C extends across the space between the arms $b^3$ of the drum and the inner sides of the ends $A^2$ of the casing. Thus the inner sides of the casing form part of the gutters, which communicate at their lowest parts with the outlet-pipes Z through the openings $a^5$.

The bottoms of the pockets $B^3$ are covered with filter-cloths D, which allow the clear liquid to pass through into the corrugations, from whence it finds its way into the cross-grooves $b'$ and thence through the openings $b^2$ into the gutters C, from which it is discharged through the openings $a^5$ into the outlet-pipes Z.

Two or more springs E are secured in each of the pockets $B^3$, and the tendency of these springs is to stand slightly outward, as shown in Fig. 4, with the curved free end $e$ extending slightly beyond the periphery of the drum.

The lower part of the casing is open, as at $A^5$ in Fig. 1, to allow the contents of the pockets to be thrown out by the springs E as the pockets pass this open portion.

In operation the material to be filtered is supplied to the inlet-pipes X under pressure and passes to the passages $a^2$ and through the ports $a$ into the pockets $B^3$ on the drum. The drum is rotated slowly in the direction of the arrow, and as the pockets pass the opening $A^5$ the ends $e$ of the springs E pass up the inclined edges $a^6$ of the opening $A^5$. Thus the springs are pressed back to the bottoms of the pockets, so that when the pockets pass between the ports $a$ the material to be filtered will flow in between the perforated plate $A^3$ and the filter-cloth D in the bottom of the pocket and upon the springs E, which are pressed down upon the filter-cloth D. As the drum continues to turn the material is forced into the pockets under such pressure that the liquid part thereof is forced through the filter-cloths D into the corrugations in the bottoms of the pockets and also through the perforated plate $A^3$ and the filter-cloths D' into the corrugations in the interior of the casing. From these latter corrugations it passes through the ports $a^3$ into the passages $a^4$ and out through the outlet-pipes Y, and from the corrugations in the bottoms of the pockets it passes into the grooves $b'$ and through the passages $b^2$ into the gutters C, from whence it passes through the passages $a^5$ to the outlet-pipes Z. It will be obvious that the outlet-pipes Z may be connected with the outlet-pipes Y or that all these outlet-pipes may empty into the same reservoir or conduit.

It will be seen by inspection of Fig. 1 that the ports $a$ do not open into the pockets when the latter are in their highest position—i. e., opposite to the opening $A^5$. This is to prevent downward pressure upon the shaft B' when the pressure is relieved at the bottom by the pockets passing over the opening $A^5$.

The material to be filtered remains in the pockets under the pressure at which it is forced through the ports $a$ for about three-fourths of one revolution of the drum, by which time the liquid is forced out and the solid parts are pressed into a compact cake, which lies upon the springs E and filter-cloth D at the bottoms of the pockets and also against the interior surface of the casing A. As each pocket passes over the opening $A^5$ the pressure on the outside of the cake is relieved, and when the ends $e$ of the springs E pass out of the inclined sides $a^6$ of the opening $A^5$ the said springs will throw the cake out of the pocket. As the drum continues to rotate and the pocket is carried within the casing A the springs E are again pressed down upon the cloth D in the bottom of the pocket, thus placing the parts in position for refilling. As each pocket $B^3$ passes over the opening $A^5$ a cake of compressed material is thrown out.

In Figs. 5 to 7 we have shown a slight modification of the device in which the material to be filtered is fed through the central shaft and through the arms of the drum. In this instance the central shaft H, which is journaled in the ends $G^2$ of the cylindrical casing G, is hollow and has revolubly mounted on the ends thereof, outside of the casing G, boxes I, which communicate with the interior of the shaft H and into which the material to be filtered is fed through the pipes I'. The arms K' of the drum K are tubular and communicate, through openings $k$, with the interior of the hollow shaft H and also open through the periphery of the drum K into the pockets $K^2$. These pockets are corrugated, as at $k^2$, and are provided with the springs E, as in the first drum B. The interior of the casing G is also corrugated, as at $g$, and provided with filter-cloth D' and perforated plate $g'$, through which the fluid passes to the corrugations and thence through the openings $g^2$ into the passages $g^3$, which communicate with the outlet-pipes Z'. In this instance the material to be filtered is forced under pressure through the inlet-pipes I' and boxes I into the hollow shaft H, from which it passes through the arms K' into the pockets $K^2$, where the liquid is pressed through the perforated plate $g'$ and filter-cloth D' and passes off through the vents $g^2$, passage $g^3$, and outlet-pipes Z', the solid material being compressed into cakes and ejected by the springs E as the pockets pass over the opening in the lower part of the casing, as in the first form of the device. When the pockets pass over the opening in the lower part of the casing where the cake is ejected, it will be necessary to cut off the flow of material to those particular pockets while they are passing over the opening and also to cut off the pressure from the pockets on the opposite side of the drum to prevent undue pressure on one side of the drum. This we accomplish by the cut-off valves M, which are rigidly mounted on a shaft M', which extends centrally through the hollow shaft H and is mounted to turn freely therein. The valves M are made of the proper size to cover two of the openings $k$, as shown in Fig. 7. On one end of the shaft M' is a crank-arm $m$, slotted, as at $m'$, to receive a pin $n$ on a lever N, fulcrumed in an overhanging bracket O. The end of the lever N beyond the pin $n$ is shaped to form a dog $n'$, and the opposite end of the said lever is connected to a rod P, which enters a dash-pot P'. A concave disk H' is secured to the end of the hollow shaft H, and said disk is provided with an inwardly-turned flange $h$, having rounded teeth $h'$, which engage the dog $n'$ on the lever N. As the shaft H and drum K are turned the teeth $h'$, which correspond in number to the arms K' in the drum, will engage the dog $n'$ and oscillate the lever N, and with it the crank-arm $m$, thus causing the valves M to move with the said arms as they cross the opening in the lower part of the casing and keeping the openings $k$ closed while the pockets with which they communicate cross the said openings. This movement of the lever N will draw the rod P and piston attached thereto up in the dash-pot, causing a vaccuum below said piston, which will quickly return the parts to their normal position when the dog passes off of the tooth $h'$. This will cause the valve M to oscillate back and close the next opening $k$, when the oscillating movement of the valve will be continued. Secured to the arms $K'$ is a circular toothed rack Q, with which meshes a pinion R on a shaft $R'$, which may be turned by any suitable motive power to turn the drum.

Having thus described our invention, what we claim, and desire to secure by Letters Patent of the United States, is—

1. In a pressure-filter, the combination with a cylindrical casing; of a drum mounted to turn in said cylindrical casing, pockets in said drum, filter-cloths in said pockets, and means for conducting material to said pockets, and for conducting liquid from said pockets, and springs in said pockets for throwing the solid material out, substantially as described.

2. In a pressure-filter, the combination with a cylindrical casing having a discharge-opening therethrough, of a drum mounted to turn in said cylindrical casing, pockets in said drum, filter-cloths in said pockets, means for conducting material to said pockets, means for conducting the liquid away from said pockets, means for discharging the contents from said pockets and means for cutting off the flow of material to said pockets while passing the discharge-opening, substantially as described.

3. In a pressure-filter, the combination with a cylindrical casing having interior corrugations a filter-cloth, and a perforated plate covering said corrugations, of a drum mounted to turn in said casing and having pockets in its periphery, corrugations in said pockets, means for conducting material into said pockets, and for conducting the liquid away from said pockets, and means for ejecting the solid material from said pockets, substantially as described.

4. In a pressure-filter, the combination with a cylindrical casing having interior corrugations, a filter-cloth, and a perforated plate covering said corrugations, of a drum mounted to turn in said casing and having pockets in its periphery, corrugations in said pockets, means for conducting material into said pockets, and for conducting the liquid away from said pockets, means for discharging the solid material from said pockets and means for cutting off the flow of material to the pockets while said discharge is taking place, substantially as described.

5. In a pressure-filter, the combination with a cylindrical casing having interior corrugations and outlet-passages communicating with said corrugations a filter-cloth, and a perforated plate covering said corrugations, of a drum mounted to turn in said casing, pockets in said drum having corrugations, means for conducting material to said pockets, and means for ejecting the solid material therefrom, substantially as described.

6. In a pressure-filter, the combination with a cylindrical casing having passages communicating with the interior thereof, corrugations in the interior of said casing, a filter-cloth, and a perforated plate covering said corrugations, of a drum mounted to turn in said casing and having pockets in the periphery thereof, and passages communicating with said pockets, corrugations in said pockets, filter-cloths in said pockets, and means for ejecting the solid material from said pockets, substantially as described.

7. In a pressure-filter, the combination with a cylindrical casing having passages communicating with the interior thereof, corrugations in the interior of said casing, a filter-cloth and a perforated plate covering said corrugations, of a drum mounted to turn in said casing and having pockets in the periphery thereof, and passages communicating with said pockets, corrugations in said pockets, means for cutting off the flow of material to the pockets at intervals, and means for ejecting the solid material from the pockets, substantially as described.

8. In a pressure-filter, the combination with a cylindrical casing having interior corrugations, a filter-cloth, and a perforated plate covering said corrugations, of a drum mounted to turn in said casing and having pockets in its periphery, corrugations in said pockets, means for conducting material into said pockets, and for conducting the liquid away from said pockets, and means for ejecting the solid material from said pockets, substantially as described.

9. In a pressure-filter the combination with a cylindrical casing, having interior corrugations, a filter-cloth, and a perforated plate covering said corrugations, of a drum mounted to turn in said casing and having pockets in its periphery, corrugations in said pockets, filter-cloths in said pockets, means for conducting material into said pockets, and for conducting the liquid away from said pockets, and means for ejecting the solid material from said pockets, substantially as described.

10. In a pressure-filter, the combination with a cylindrical casing having interior corrugations, and outlet-passages communicating with said corrugations, a filter-cloth, and a perforated plate covering said corrugations, of a drum mounted to turn in said casing, pockets in said drum having corrugations, means for conducting material to said pockets, and means for ejecting the solid material therefrom, substantially as described.

In testimony whereof we affix our signatures in presence of two witnesses.

FRANK S. YOUNG.
W. W. UEBERROTH.

Witnesses:
H. M. UEBERROTH,
HOWARD S. HESS.